(12) United States Patent
Weidel

(10) Patent No.: US 7,150,552 B2
(45) Date of Patent: Dec. 19, 2006

(54) VEHICLE HEADLIGHT

(75) Inventor: Edgar Weidel, Senden (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 10/176,181

(22) Filed: Jun. 20, 2002

(65) Prior Publication Data
US 2002/0196639 A1 Dec. 26, 2002

(30) Foreign Application Priority Data
Jun. 20, 2001 (DE) ............................... 101 29 743

(51) Int. Cl.
*B60Q 1/04* (2006.01)
*H01L 31/232* (2006.01)

(52) U.S. Cl. .................. 362/545; 362/464; 362/521; 362/800

(58) Field of Classification Search ............. 362/521, 362/268, 545, 331, 800, 555, 464, 553, 544, 362/276
See application file for complete search history.

(56) References Cited

U.S. PATENT DOCUMENTS

| | | | |
|---|---|---|---|
| 4,917,486 A * | 4/1990 | Raven et al. ............... 351/221 |
| 5,184,882 A * | 2/1993 | Davenport et al. .......... 362/554 |
| 5,947,587 A * | 9/1999 | Keuper et al. ............... 362/235 |
| 6,102,552 A | 8/2000 | Tullis | |
| 6,406,172 B1 * | 6/2002 | Harbers et al. ............. 362/544 |
| 6,520,669 B1 * | 2/2003 | Chen et al. ................ 362/545 |
| 6,587,573 B1 * | 7/2003 | Stam et al. ................ 382/104 |
| 2001/0050340 A1 * | 12/2001 | Holz et al. ............... 250/341.1 |
| 2004/0022051 A1 | 2/2004 | Weidel | |

FOREIGN PATENT DOCUMENTS

DE   40 07 646 A1   9/1991

* cited by examiner

Primary Examiner—Sandra O'Shea
Assistant Examiner—Guiyoung Lee
(74) Attorney, Agent, or Firm—Akerman Senterfitt; Yonghong Chen; Stephan Pendorf

(57) ABSTRACT

The invention concerns a vehicle headlight, comprising a two-dimensional array (2) of a plurality of electronic light emitter elements (4), which are arranged for emitting a plurality of parallel light beams (6), a collection lens (8), which is provided one focal length away essentially parallel to the two-dimensional array and positioned for receiving the light emitted by the array, and a control electronic for the light emitter elements operatively associated for energizing the light emitter elements (4) individually or in groups. This results in a headlight with variable light emission characteristics, which is mechanically particularly simple to construct, is operationally reliable, and is rapid to react.

11 Claims, 2 Drawing Sheets

VEHICLE HEADLIGHT

BACKGROUND OF THE INVENTION

1. Field of the Invention

The invention concerns a vehicle headlight.

2. Description of the Related Art

Poor visibility at night is a stressful and dangerous situation, and is feared by many drivers. The occurrence of accidents is significantly higher under poor visibility conditions than in the case of vehicle operation by day under good visibility conditions. In particular at night, the following difficulties occur:

The range of view with dim or normal headlights is minimal when there is oncoming traffic, and is erroneously estimated by many vehicle operators. The leads to a late recognition of non-illuminated obstacles, pedestrians, bicycles without lights and of animals, and therewith leads to accidents.

The vehicle operator is blinded for a short time by the headlights of oncoming vehicles, and their reflection particularly in the case of wet road surfaces the vehicle operator is driving for a short period of time into a black hole. Particularly endangered are those with poor night vision and older vehicle operators due to their reduced vision capacity.

In the case of rain, fog and snowdrifts the range of vision can again be substantially reduced.

In order to optimally illuminate the traffic scene at night, vehicle headlights are known, of which the illumination characteristics can be adapted to the course of the road. These headlights can be motorized for tilting in the vertical direction, in order to compensate for differences in vehicle loads or crests or dips in the road ahead of the vehicle, or may be pivoted in the horizontal direction, in order to compensate for curves. The mechanism necessary therefore is frequently expensive and liable to fail, and as an alternative there remains only the possibility of providing different types of headlights, and switching between them. This type of headlight can also be employed in order to produce desired breadth, or lowering of illumination in the case of fog or when it is snowing. For design and cost reasons it is however frequently not desired to equip a vehicle with a large number of headlights.

A further improvement of the view at night can be achieved by an opto-electronic system, as disclosed for example in DE 40 07 646 A1. The system records a video image of a traffic scene and represents this to the vehicle operator in suitable form. The represented image contains supplemental information, which the vehicle operator cannot see with his own eyes or can only recognize with difficulty, in particular at night, poor weather and fog.

In addition to the normal headlights this system supplementally contains infrared headlights, which utilize near infrared emitting laser diodes as light sources. The laser diodes are driven pulsed. A CCD-camera is incorporated in the roof area of the vehicle for recording the video image. The CCD-camera has an electronic lock, which is synchronized with the laser diodes. An optical band pass filter is introduced prior to the camera lens. The video image is shown to the vehicle operator on a LCD-display. The employment of laser lights has a number of advantages:

The lasers emit in the near infrared at a wavelength of 810 nm. Since the infrared light is nearly invisible to the human eye, illumination can be left turned on continuously.

By use of laser lights it becomes possible to substantially reduce the blinding of the camera by the visible headlights of oncoming vehicles. On the one hand the laser light is emitted at a spectral breadth of only a few nm, while visible light sources such as halogen lights cover several hundred nm. If one applies an optical filter with a narrow transmissivity breadth in front of the camera lens, then almost the entire laser light is transmitted while the light of oncoming vehicles is reduced by a factor of 50 to 100. On the other hand, the laser diodes precisely follow the drive current, it can thus be rapidly pulsed in a simple manner. If one employs a video camera with a rapid electronic shutter, which is synchronized with the lasers, then the light of oncoming vehicles can be further reduced.

In the above mentioned publication it is further proposed that the intensity of the illumination is varied depending upon the emission angle, for example in order to illuminate the foreground of a traffic scene with less intensity than the background. Therewith the surface illumination by the laser light, which decreases with increasing distance, can be compensated and a more even illumination of the scene can be achieved. More specifically, a laser beam is pivoted back and forth in one spatial direction, and in a direction perpendicular thereto is either evenly distributed or is likewise rapidly pivoted, in order to sequentially sample the traffic scene, and the intensity of the laser light is varied in synchrony with the movement of the pivoting mirror. There are however significant technological requirements for the mechanics of the pivoting of the mirror, which in the case of a vehicle are not easily accomplished. The reaction times may be shorter than with a purely mechanical pivoting of conventional headlights, but they do remain limited.

SUMMARY OF THE INVENTION

The invention is concerned with the task of providing a headlight with variable illumination characteristics, which can be mechanically constructed particularly simply, operates reliably and, besides this, reacts rapidly.

This task is solved by a vehicle headlight with a two-dimensional array comprising a plurality of electronic lighting elements, which are arranged to emit a plurality of light beams parallel to each other; a collection lens, which is arranged approximately its focal length away essentially parallel to the surface of the array, in order to receive the light from the array; and a control electronic for the illumination elements, which is set up to allow the light elements to selectively illuminate or emit individually or group-wise.

In accordance with the invention the illumination characteristic of the headlight can be adapted to different traffic or environmental considerations solely with the aid of the control electronic. No moveable mechanical parts are necessary, only one headlight lens is necessary.

The invention can be employed in a night illumination system, as described in previously mentioned DE 40 07 646 A1, preferably in that the headlight is provided with LEDs or laser diodes, which emit in the near infrared range. The invention can however also be used as vehicle headlights for visible light, preferably in that the headlight is provided with white light LEDs or laser diodes. Such a vehicle headlight can, depending upon the control or driving of the light elements, produce high beams or low beams as well a large number of further illumination characteristics. Also possible is a combined application of the headlight with variable illumination characteristics both for visible as well as for non-visible, in that the headlight is provided with light elements of differing emissions.

The light beams of the individual light elements have, after they pass through the collection lens, a particular divergence which is actually desirable in the application as a vehicle headlight, on the basis of which they overlap with each other after a certain distance. In the case that the design is such that the divergence is so small, that close objects would appear to exhibit an undesired striped pattern, a diffuser can be provided, which appropriately spreads the light beams. The diffuser is preferably provided close to the collection lens on its emission side or is integrated in the collection lens (which may also be a convergent, divergent, or condenser lens).

In a preferred embodiment the control electronic selects receives data regarding the traffic situation or environmental conditions from sensors and based thereon selects those light elements which are allowed to illuminate. Appropriate sensors would include, for example, those which measure the spring compression of the individual wheels, road curve sensors, sensors for visibility, weather and street lighting relationships and the vehicle environment as well as many others. Since the invention can be carried out without moveable mechanical components, the adaptation to the detected traffic or environmental conditions can occur rapidly, so that these can be compensated for, even if they change rapidly over time.

The individual light elements can be activated or, as the case may be, deactivated by a simple switching on and off, wherein intermediate intensities can be selected in that for example every second light element is activated. Intermediate intensities can however also be achieved thereby, that the control electronic supplies some or all light elements with a lower drive current than the set current. In special cases, for example when sensors in the vehicle, during poor environmental illumination conditions, register an extraordinary danger situation, the control electronics can illuminate the light elements or even only those which illuminate a particular sector in which the danger situation is registered, and supply these even with a excess of current, in order to better highlight the situation for the vehicle operator, without the life expectancy of the light elements suffering significantly thereby.

In the preferred embodiment the inventive vehicle headlight is a front headlight. It is however conceivable that it forms for example a combination of backup light, brake light and fog light, wherein in normal vehicle operation at night only individual light elements are activated, further light elements are activated during braking whereby certain special provided light elements in certain cases provide the illumination characteristic of a fog light.

In another embodiment the vehicle headlight includes two dimensional arrays, which respectively include a number of electronic light elements, which are provided to emit a plurality of light beams parallel to each other, wherein each array of emitted light has a wavelength which is different from those of the one or more other arrays, and wherein the multiple arrays are so arranged, that their respective light beams meet in a beam combiner (the reverse of a beam diffuser or distributor), which directs the light beams of all arrays in parallel to a common collection lens, as well as a control electronic for the light elements, which is designed to selectively allow individual or group of light elements to illuminate.

In this manner it is possible to produce for example an array of infrared light, and the remaining arrays can produce visible light. Alternatively or additionally two or more arrays can emit visible monochromic light with respective different wavelengths, which together produce white light. In both cases all that is needed is one collection lens, for which reason the size of the headlight can be made small.

BRIEF DESCRIPTION OF THE DRAWINGS

Further characteristics and advantages of the invention can be seen from the dependent claims and the following description of embodiments on the basis of the figures. In the figures there is shown:

DETAILED DESCRIPTION OF THE INVENTION

The light source can be a flat array of laser diodes—preferably surface emitting lasers, so-called VCSELs—or an array of tightly or densely packed individual LEDs; both types are collectively referred to in the following with the term diode array.

Figure 1:
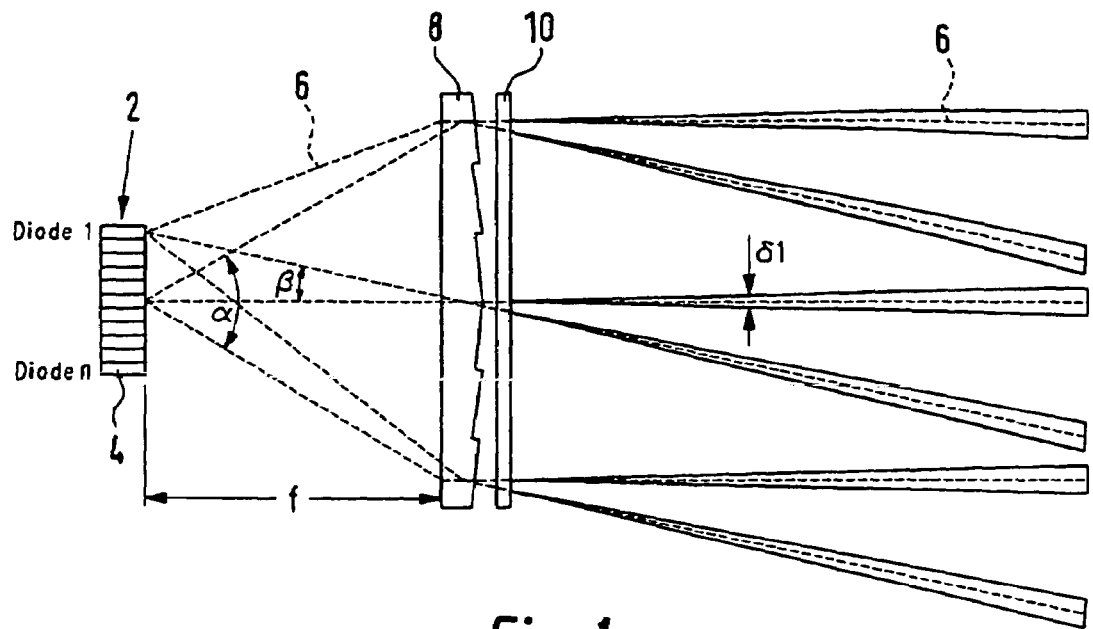
FIG. 1 a side view of a vehicle headlight with light element array.
Figure 2:
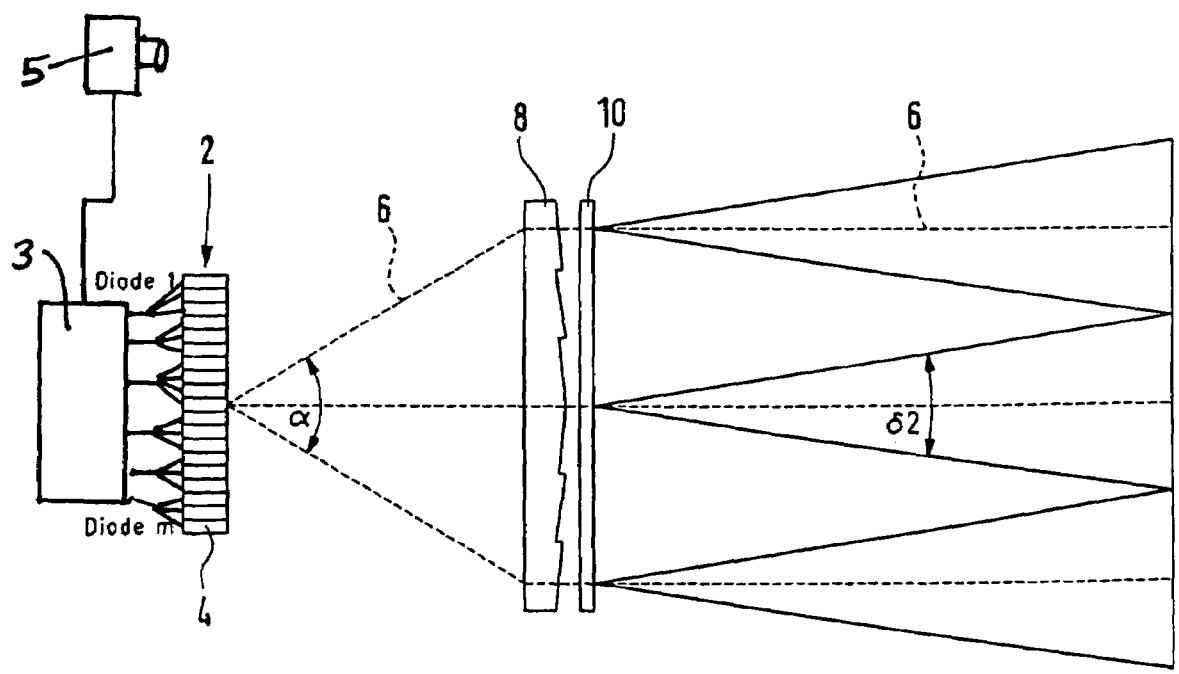
FIG. 2 a view of the vehicle headlight from above.

The diode array 2 in the illustrated embodiment is a quadrilateral arrangement in the two dimensional plane of n diodes 4 in the vertical direction (FIG. 1) and m diodes 4 in horizontal direction (FIG. 2). That means, overall a total of n×m diodes 4 are provided in the rectangular field with n rows and m columns. The arrangement however need not be quadrilateral, but rather can be for example also elliptical or semi-elliptical, depending upon which area of ahead of the vehicle in which the headlight is incorporated is to be illuminated.

The diodes 4 are supplied with current by a not shown control circuit, which makes it possible to selectively allow the diodes 4 to illuminate with desired intensity, either individually or in predetermined groups.

The diode array 2 is connected or associated with a not shown cooling body at the backside of the headlight. The light of each individual diode 4 broadens with an angle α of for example 10° both vertically as well as horizontally. The light beams emitted by the individual diodes 4 are shown with dotted lines in FIGS. 1 and 2. For ease of illustration in FIG. 1 only beams of two diodes 4 and in FIG. 2 only one diode 4 emission is indicated or illustrated; further only the central beam and the edge beam of the light beam 6 emitted by the individual diodes 4 is shown.

The diode array 2 is introduced to the focal point of a collection lens 8. For purposes of explanation the diode array 2 and the collection lens 8 are illustrated in such close proximity that the angle α in the figures appears substantially larger than it would normally.

The collection lens 8 can be a simple lens, a planar convex lens, a Fresnel lens or an aspherical lens. The collection lens 8 collumates the diverging light beams 6 of each diode 4. After emission from the collection lens 8 the light beams 6 exhibit a not shown divergence δ, which depends upon the size of the light emission surface of one individual diode 4, upon refraction and upon the shape of the collection lens 8.

In the vertical direction (FIG. 1) this divergence δ is expanded by a diffuser 10 to a divergence of δ1. The δ1 should be so large, that the light beams 6 of adjacent diodes 4 overlap, and such that upon suitable electronic control the diodes 4 produce the desired angular distribution of the light beams 6. The maximal emitable vertical angle range or area is shown in FIG. 1 by 2β and can be calculated by the distance of the outer-lying diodes 4 divided by the focal width f of the collection lens 8.

In the horizontal direction, in accordance with FIG. 2, a divergence δ2 differing from δ1 can be produced, namely by appropriate arrangement of the diffuser 10 and/or on the basis of a non-spherical-symmetrical emission characteristic of the diodes 4.

As diffuser 10 one can employ either a holographic diffuser or a diffuser with micro-lenses or micro-wedges. The diffuser 10 can work on the basis of refraction or diffraction. In a further, not shown, manner of construction, the diffuser 10 can be integrated in the collection lens 8.

The diffuser 10 produces the desired headlight distribution from the incident culminated light beams 6. In the case that the divergence δ of the light beam 6 emitted from the collection lens 8 is large enough, then the diffuser 10 can be dispensed with.

The angular distribution of the light emitted by the headlight can now be changed and adapted over a broad area quite rapidly, and namely by electronic control of individual diodes 4 or groups of diodes 4. Examples of such a selective control in the the vertical or as the case may be horizontal direction is described in the following.

A) In the Vertical Direction

1) If all diode lines are energized, one obtains simultaneously high beams and dimmed beams.
2) If only the diode lines n/2 through n (that is the lower half of the diodes 4 in FIG. 1) are energized, one obtains dim light.
3) In general, the vertical light distribution can be controlled, varied and optimized by the intensity of the current with which the individual diode lines are energized.
4) A tilting of the vehicle by heavy loading or tilting during operation in the course of unevenness of the roadway can be compensated by measuring the spring compression of the individual wheels and, with a control signal derived therefrom for the drive current of the diode lines, be dynamically compensated. This control can be so rapid that no change in the illumination can be percieved even in the course of strong unevenness. Therewith an even, optimal illumination of the roadway can be accomplished.

B) In the Horizontal Direction

In analogous manner it becomes possible in the horizontal direction by control of appropriate groups of diodes 4 to adjust and optimize the horizontal light distribution. The distribution can be selected to be broader or narrower, and the maximum can be pivoted towards one side, in order to illuminate into curves. Also these variations are accomplished by changing the current to the diodes.

Figure 3:
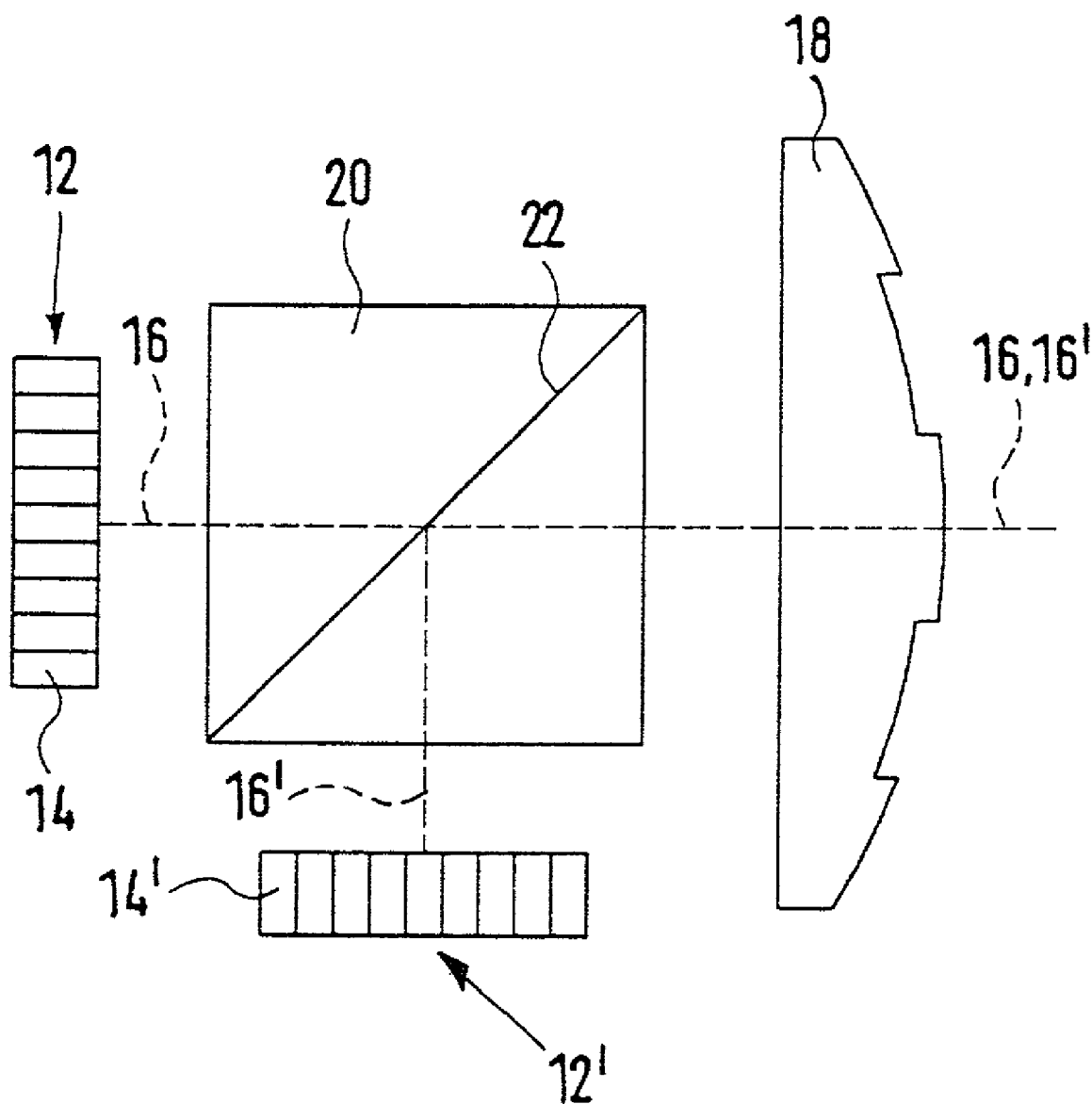
FIG. 3 an embodiment for a vehicle headlight with multiple light element arrays.

FIG. 3 shows a vehicle headlight, which contains two dimensional diodes arrays 12, 12' which respectively contain a plurality of light diodes 14, 14'. The diodes 14, 14' emit in operation respectively one set of light beams 16, 16' parallel to each other, from which in FIG. 3 respectively only the central beam is illustrated. The diode arrays 12, 12' are oriented perpendicular to each other, so that their light beams 16, 16' impinge in a beam divider 20 which direct the light beams 16, 16' of the two diode arrays 12, 12' parallel to a common collection lens 18. That means, the beam distributor 20 is used here as a beam combiner. Further, a here not shown diffuser can be employed as in FIG. 1.

As an example, the light beams 16 are visible light with a particular wavelength $\lambda_1$ and the light beams 16' are visible light with a particular wavelength $\lambda_2$, which is different from $\lambda_1$, wherein $\lambda_1$ and $\lambda_2$ lie on the normal color table on a plane through the color spectrum center (i.e., through the center non-colored point, resulting in a full addition). Thereby the light united by the beam distributor 20 appears to the human eye as white light, and one can produce a white light headlight with employment of monochromic light diodes and with only one collection lens 18, which is the element which normally occupies the most substantial part of the headlight space.

Alternatively one of the wavelengths $\lambda_1$ and $\lambda_2$ can lie in the infrared range, so that with only one collection lens 18 a combined infrared and visible light headlight is produced.

If one in this case would also like to use for the vehicle headlight monochromic light diodes, one requires at least one further diode array, which in FIG. 3 is not shown, and a beam distributor, which units the light of all diode arrays.

In the example from FIG. 3 the beam distributor 20 includes a dielectric mirror layer 22, which is highly reflective for $\lambda_1$ and transmissive for $\lambda_2$. Such a beam splitter, in particular its dielectric layer, can be more easily produced, when the angle of incidence of both light beam groups is smaller than 45°. Sharper and more acute angles of incidence make it easier to unite more than two light beam groups. Appropriate light dividers are known for example in color CCD cameras with three CCD elements for the different colors, which in the application for a vehicle headlight however are passed through by light in the reverse direction.

The diodes 14, 14' of diode arrays 12, 12' are, similar to that as described above, selectively supplied with current either from a common source or from multiple separate control devices according to the respective objective for illumination.

What is claimed is:

1. A dynamic adjustable vehicle headlight, comprising:
   (a) a two-dimensional array (2) of a plurality of electronic light emitter elements (4) selected from the group consisting of surface emitting lasers and tightly packed individual LEDs, which are arranged for emitting a plurality of parallel light beams (6),
   (b) a collection lens (8), provided one focal length away and essentially parallel to the two-dimensional array and positioned for receiving the light emitted by the array, and
   (c) a control electronic (3) for the light emitter elements operatively associated for energizing the light emitter elements (4) in groups.

2. The vehicle headlight according to claim 1, wherein the light emitters (4) emit infrared light.

3. The vehicle headlight according to claim 1, wherein the light emitters (4) emit visible light.

4. The vehicle headlight according to claim 1, wherein the light emitters (4) are laser diodes.

5. The vehicle headlight according to claim 1, wherein the light emitters (4) are LEDs.

6. The vehicle headlight according to claim 1, wherein a diffuser (10) is positioned in the path of the light beams (6) of one or more of the light emitters (4).

7. The vehicle headlight according to claim 6, wherein the light diffuser (10) is positioned in close proximity to the collection lens (8).

8. The vehicle headlight according to claim 6, wherein the light diffuser (10) is integrated in the collection lens (8).

9. The vehicle headlight according to claim 1, wherein the control electronics is designed for selectively energizing light elements (4) in response to data received from sensors (5) regarding the traffic or environmental conditions.

10. The vehicle headlight according to claim 1, wherein the control electronics is designed to produce in some or all of the light emitters (4) light intensities, which is enhanced or reduced than the normal light intensity of the light emitters.

11. The vehicle headlight according to claim 1, wherein the headlight is a front headlight.

* * * * *